SYSTEM FOR COUPLING ONE OR MORE OF A PLURALITY OF OUTPUT DEVICES SUCH AS TELEVISION MONITORS TO ONE OF A PLURALITY OF INPUT DEVICES SUCH AS TELEVISION CAMERAS

Filed May 4, 1965

INVENTORS
JAMES L. KIMBALL
WILLIAM R. TOMPKINS
HAROLD R. AHRENS
BY Lyon & Lyon
ATTORNEYS Feb. 4, 1969 J. L. KIMBALL ET AL 3,426,145

SYSTEM FOR COUPLING ONE OR MORE OF A PLURALITY OF OUTPUT DEVICES SUCH AS TELEVISION MONITORS TO ONE OF A PLURALITY OF INPUT DEVICES SUCH AS TELEVISION CAMERAS

Filed May 4, 1965

INVENTORS
JAMES L. KIMBALL
WILLIAM R. TOMPKINS
HAROLD R. AHRENS
BY Lyon + Lyon
ATTORNEYS INVENTORS.
JAMES L. KIMBALL
WILLIAM R. TOMPKINS
BY HAROLD R. AHRENS
Lyon & Lyon
ATTORNEYS INVENTORS.
JAMES L. KIMBALL
WILLIAM R. TOMPKINS
BY HAROLD R. AHRENS
Lyon & Lyon
ATTORNEYS Feb. 4, 1969 J. L. KIMBALL ET AL 3,426,145

SYSTEM FOR COUPLING ONE OR MORE OF A PLURALITY OF OUTPUT DEVICES SUCH AS TELEVISION MONITORS TO ONE OF A PLURALITY OF INPUT DEVICES SUCH AS TELEVISION CAMERAS

Filed May 4, 1965

Sheet 5 of 8

INVENTORS
JAMES L. KIMBALL
WILLIAM R. TOMPKINS
BY HAROLD R. AHRENS
Lyon & Lyon
ATTORNEYS Feb. 4, 1969 J. L. KIMBALL ET AL 3,426,145

SYSTEM FOR COUPLING ONE OR MORE OF A PLURALITY OF OUTPUT DEVICES SUCH AS TELEVISION MONITORS TO ONE OF A PLURALITY OF INPUT DEVICES SUCH AS TELEVISION CAMERAS

Filed May 4, 1965

INVENTORS.
JAMES L. KIMBALL
WILLIAM R. TOMPKINS
BY HAROLD R. AHRENS

Lyon & Lyon
ATTORNEYS

INVENTORS.
JAMES L. KIMBALL
WILLIAM R. TOMPKINS
BY HAROLD R. AHRENS
Lyon & Lyon
ATTORNEYS INVENTORS.
JAMES L. KIMBALL
WILLIAM R. TOMPKINS
HAROLD R. AHRENS
BY Lyon & Lyon
ATTORNEYS United States Patent Office 3,426,145

Patented Feb. 4, 1969

3,426,145

SYSTEM FOR COUPLING ONE OR MORE OF A PLURALITY OF OUTPUT DEVICES SUCH AS TELEVISION MONITORS TO ONE OF A PLURALITY OF INPUT DEVICES SUCH AS TELEVISION CAMERAS

James L. Kimball, La Mesa, and William R. Tompkins and Harold R. Ahrens, San Diego, Calif., assignors to Cohu Electronics, Inc., San Diego, Calif., a corporation of Delaware Filed May 4, 1965, Ser. No. 453,116

U.S. Cl. 178—6.8 23 Claims

Int. Cl. H04n 7/02

ABSTRACT OF THE DISCLOSURE

A video switching system for coupling one or more of a plurality of TV monitors to a single one of a plurality of TV cameras. An individual, externally operated, switch is connected between each camera and each monitor to form the necessary plurality of unique signal paths. Various amplifiers are also connected in each signal path and are constructed to operate as switches. These later switches are actuated by a DC logic signal which is internally generated within the system and which is passed to the amplifiers through the externally actuated switches.

Figure 1A:
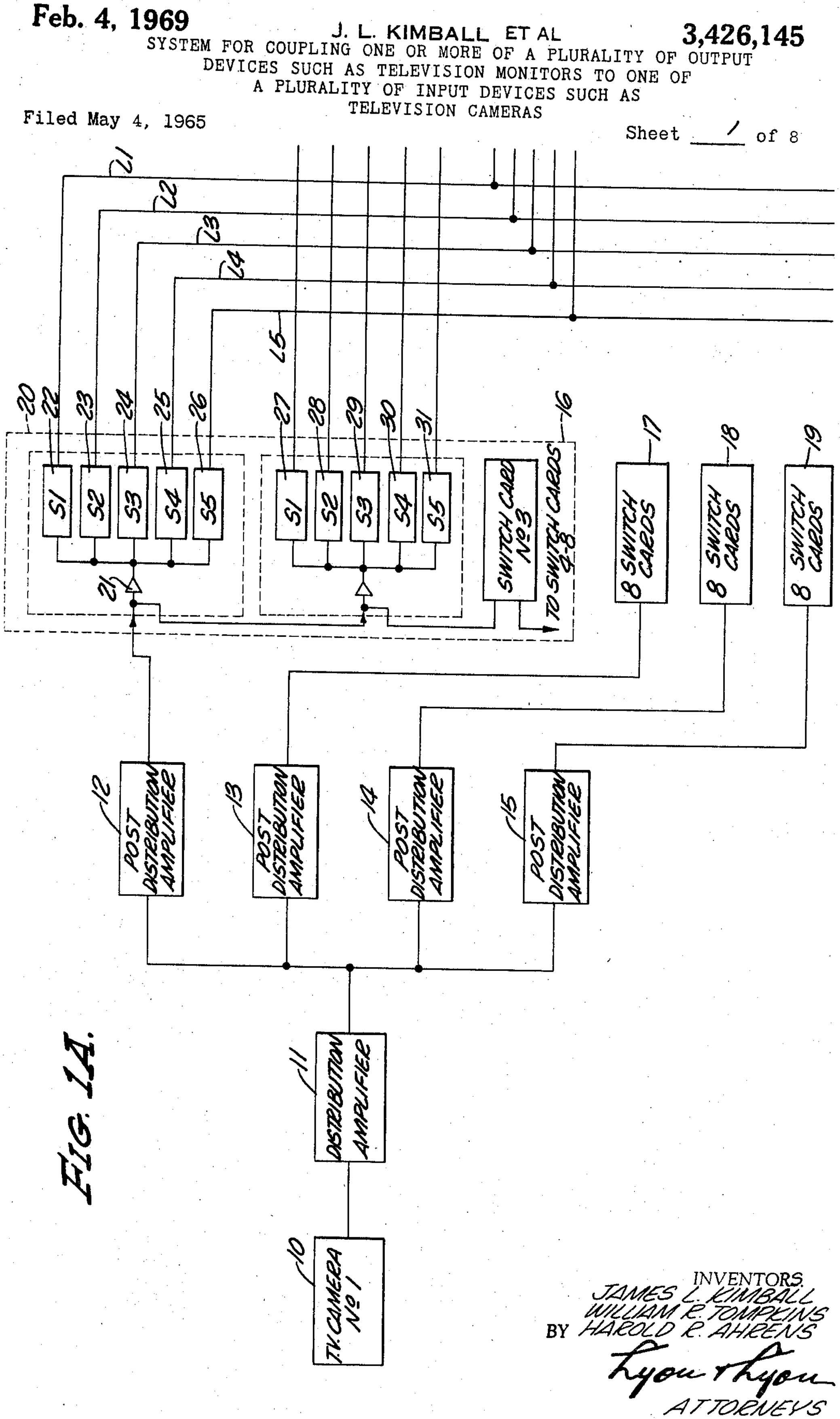

This invention relates to a switching system and more particularly relates to a system for relaying the output signal from one of a plurality of television cameras to one or more of a plurality of television monitors.

There are many instances in which it is desirable to provide closed circuit television systems which enable various personnel at remote locations to observe the performance of various unrelated activities or different portions of apparatus under test or operational conditions. For example, in industrial applications the control of a given process may require that a number of valves, meters, or the like be continuously under surveillance by one or more spatially separated observers. This can be accomplished by providing a television camera at each location where an event is to be observed, a television monitor for each observer, and a switching system for connecting the desired camera with the desired monitor at any given instant. In other applications, such as the launching of a rocket, it may be desired that different remote happenings be televised to different people during the preparation for the launching but that all of the observers watch the rocket during the launch itself, that is, watch the output of a single camera at the moment of firing. On the other hand, it may be required that a single person observe a series of events in a given sequence. In either situation, a system must be provided that is capable of supplying the output of any camera to a proper monitor or series of monitors at a given instant.

Because of the complexities of video signals, and the high signal quality required in most applications, conventional switching systems heretofore proposed have been unable to handle a large number of cameras and monitors without introducing unacceptable distortion, noise or interference into the transmitted signals. In addition to being unable to acceptably control interference, especially cross-talk, these conventional systems have been unable to rapidly and accurately switch a given monitor from one camera to another camera without either causing the monitor to flash because of the transient occurring when one camera is switched on before the other camera goes off, or causing the monitor to go dark because too great a time interval occurs between the instant when one camera is switched off and the next camera is switched on. A common means by which flashing is reduced in existing video switching systems is the employment of special additional logic control circuitry which causes the switching to take place only during the vertical blanking time interval. Since the monitor is blanked for vertical retrace during this time, the transients go unobserved.

According to the present invention, a switching system is provided that is capable of rapidly switching the output of any one of a plurality of television cameras to the input of one or more of a plurality of television monitors. The system is provided with a plurality of circuits which serve to isolate the various channels from each other and thereby maintain cross-talk and other disturbances within acceptable limits while signal quality is kept at a high level. The system is also provided with circuits which assure that a monitor will neither flash nor go dark when it is switched from the output of a first camera to the output of a second camera. These circuits allow non-vertical interval switching and thus eliminate the vertical interval logic circuitry complexity and cost. Various other circuits are provided for reducing distortion and noise so that the overall effect of the system is to provide a clear picture at each monitor which precisely corresponds to the scene viewed by the camera to which it is connected at any instant.

In any switching system wherein one of a large number of inputs must be switched to any or all of a large number of outputs, some sort of logic circuitry is required to close the proper switches and open the others. Where there is a number of series switching stages in each potential signal path, the problem of providing and programming suitable logic circuitry becomes an extremely complicated one. Conventionally in such a situation, a separate control matrix is provided for producing an output signal for each series switching stage in the switching system, and a programmed controller used to feed the control matrix the necessary input signals to cause it to produce the desired output signals in the desired sequence. As is obvious, if a large number of series switching stages must be controlled in a more or less random fashion, the complexity and expense of the matrix and controller border on the prohibitive. This problem is solved by the present invention by incorporating a logic signal into the information signal and making each series switching stage save the first in a given signal path responsive to this logic signal. It is then only necessary to provide an external control for the first switching stage; thereafter, the operation of the remaining stages is initiated by the internally generated logic signal.

It is therefore an object of the present invention to provide a switching system for connecting one of a plurality of signal generating devices with one or more of a plurality of signal utilizing devices.

It is also an object of the present invention to provide such a system for switching the output of one of a plurality of television cameras to the input of one or more television monitors.

It is another object of the present invention to provide such a system wherein each signal path includes a plurality of switching stages that are controlled by an internally generated logic signal.

It is a further object of the present invention to provide such a system having a plurality of unique switch points, each switch point being energizable to connect a given camera with a given monitor.

It is a still further object of the present invention to provide such a system where cross-talk between signal channels is kept at a minimum while signal quality is maintained.

It is yet another object of the present invention to provide such a system wherein only one of a plurality of amplifiers feeding signals from different cameras to a single monitor is operative at one time, energization of another one of the amplifiers causing immediate de-energization of the previously operative one whereby power consumption and heating are reduced as well as cross-talk.

Figures 1B, 3:
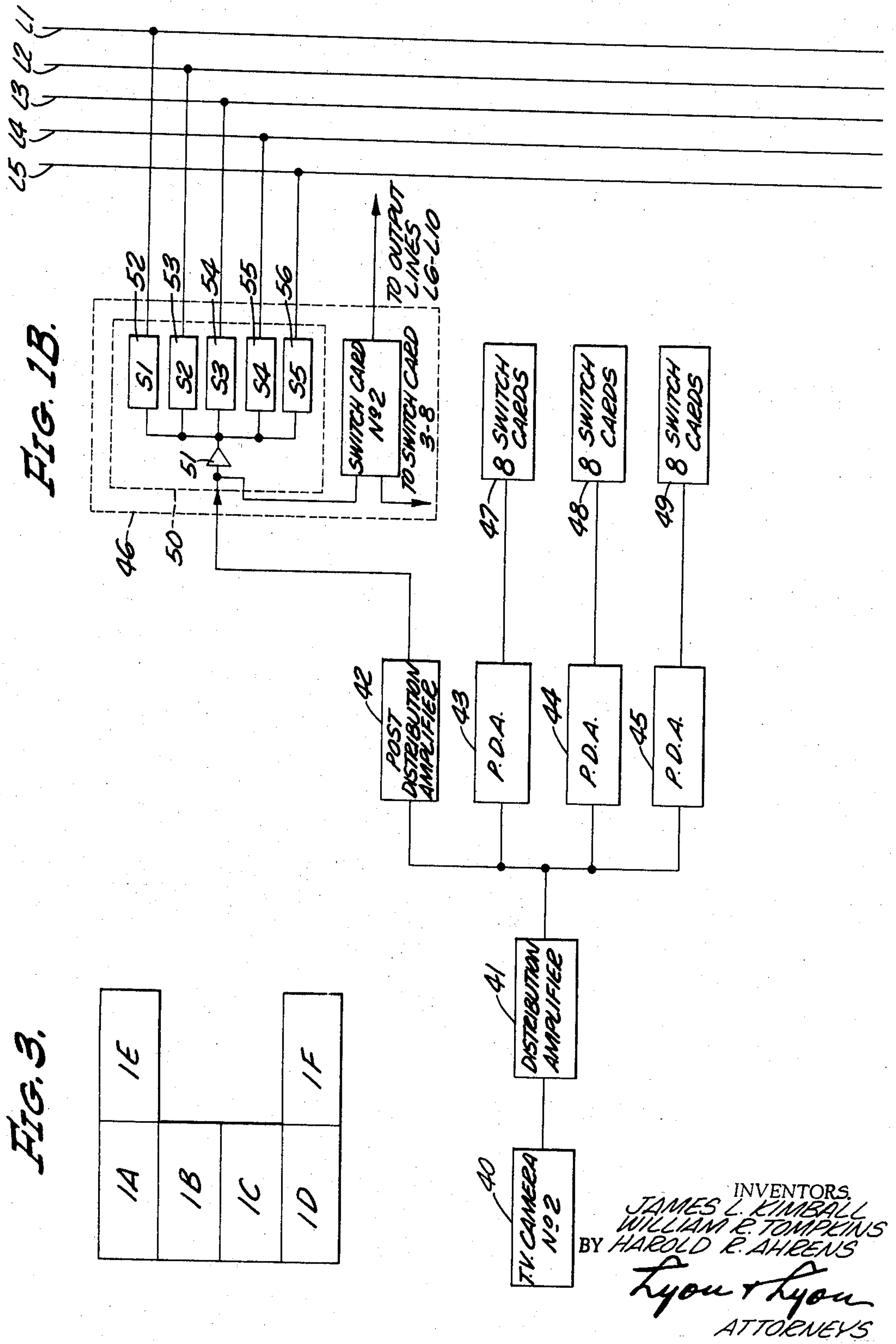
Figure 1C:
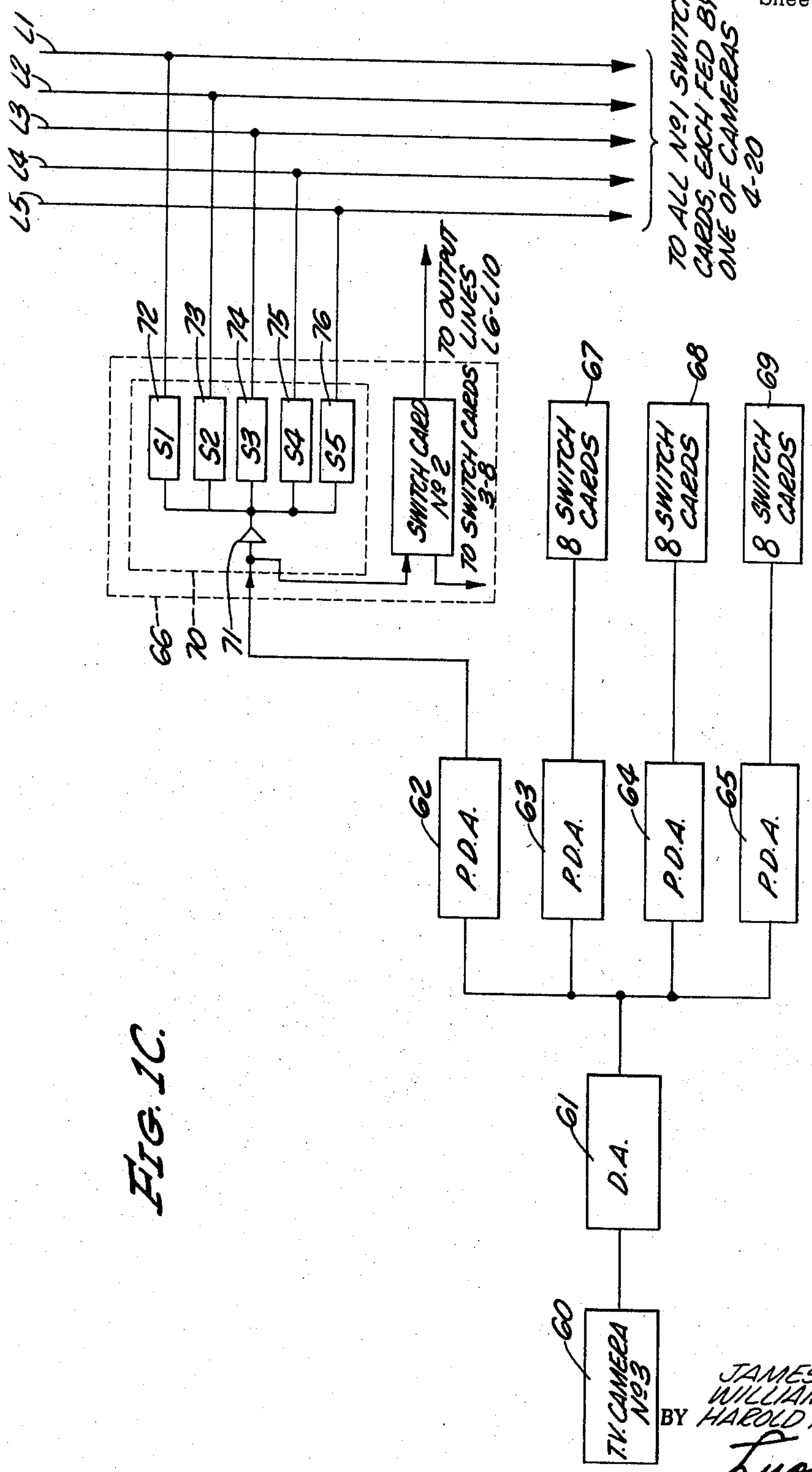
Figure 1D:
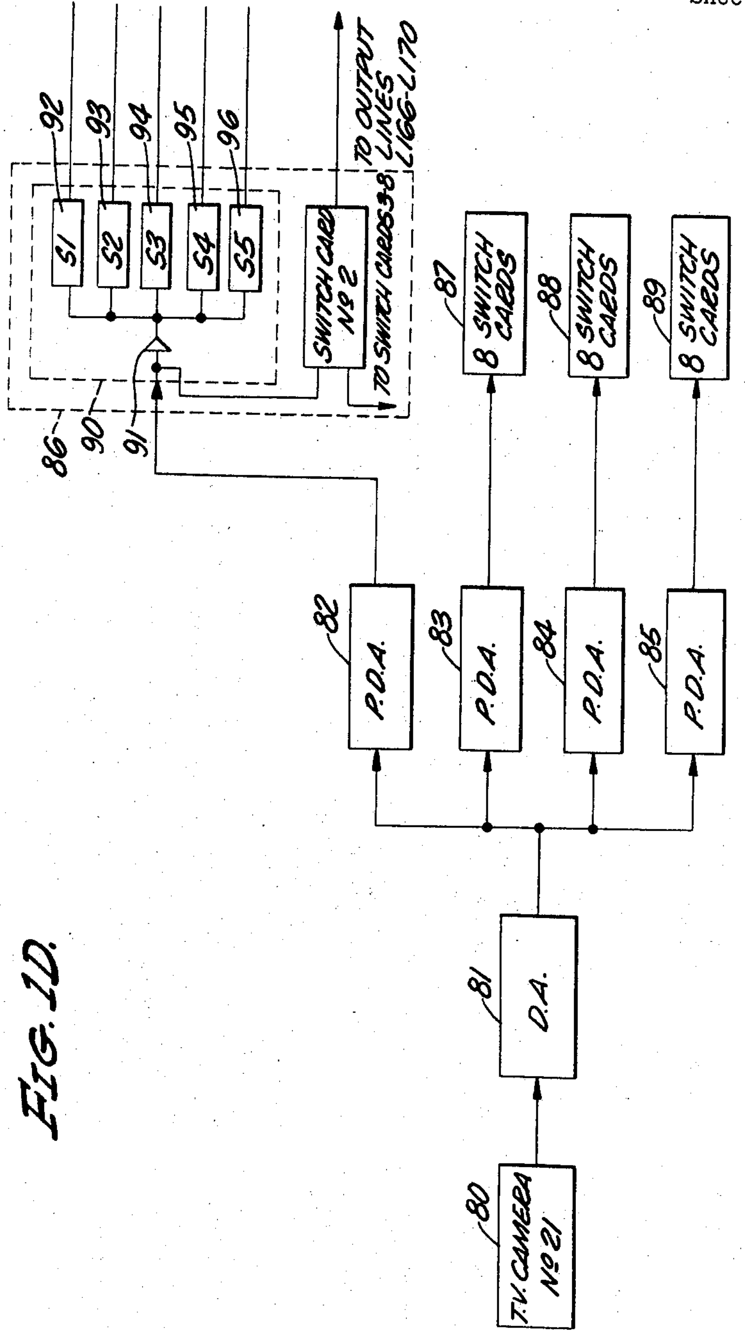
Figure 1E:
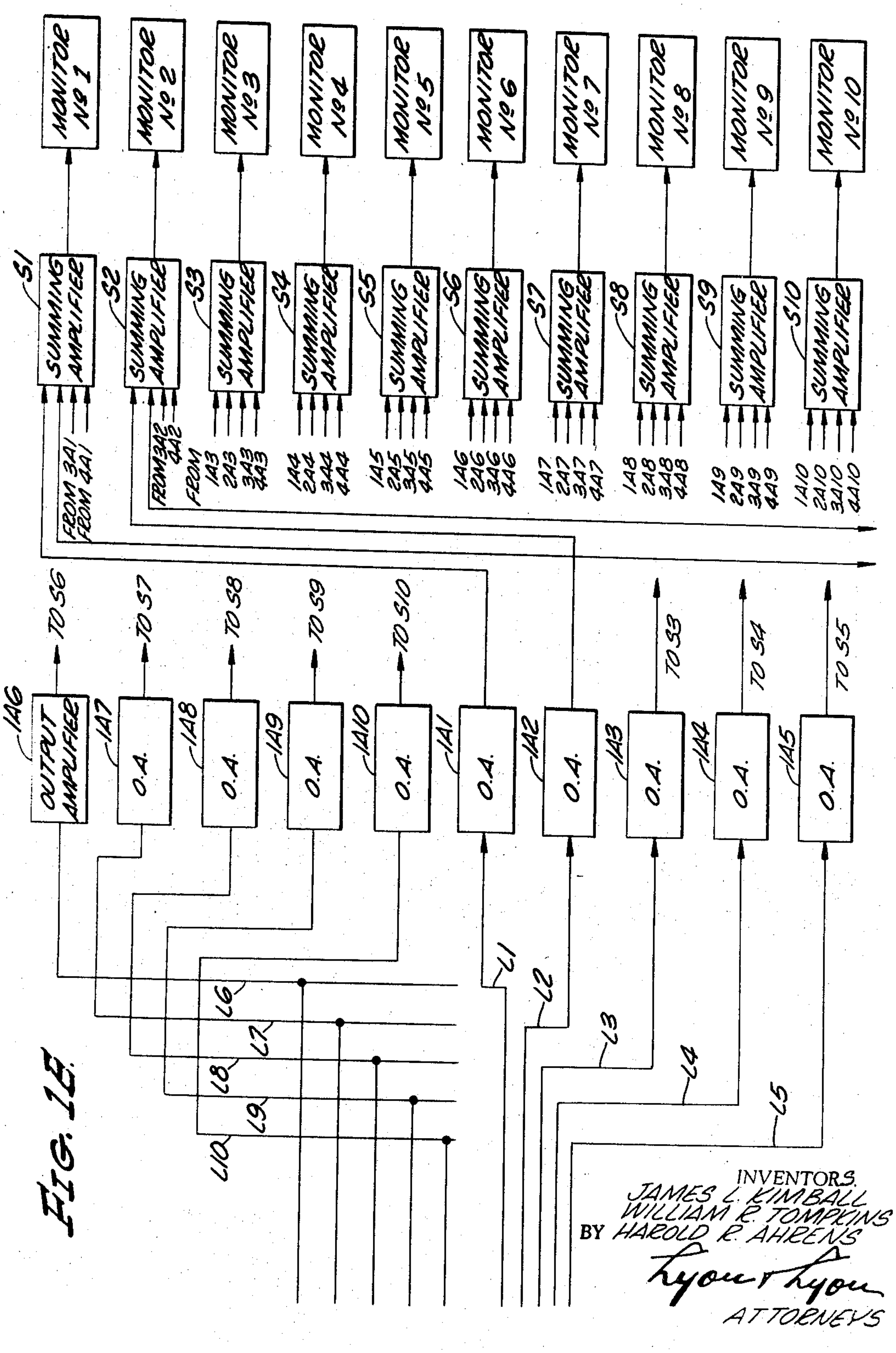
Figure 1F:
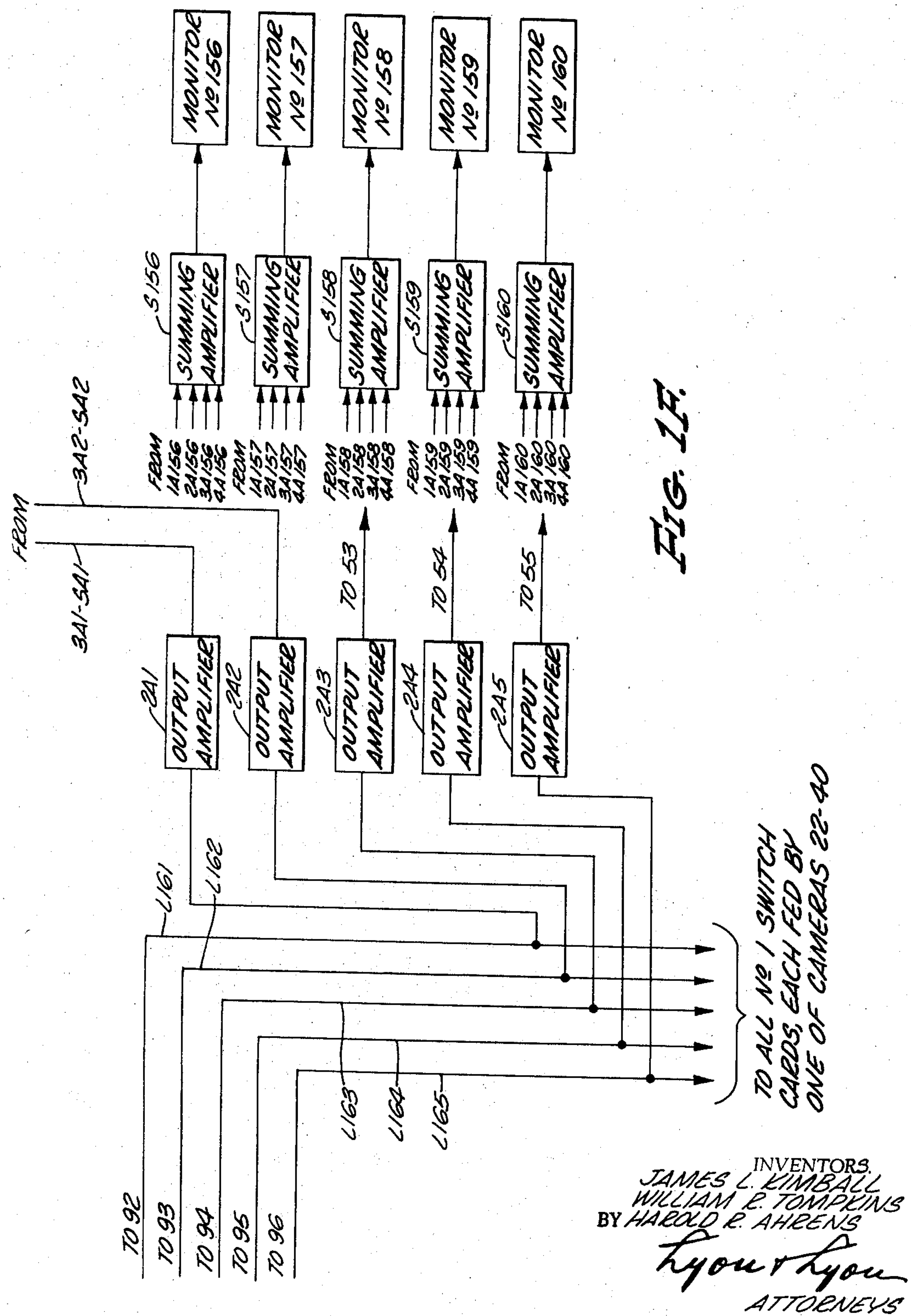
Figure 2A:
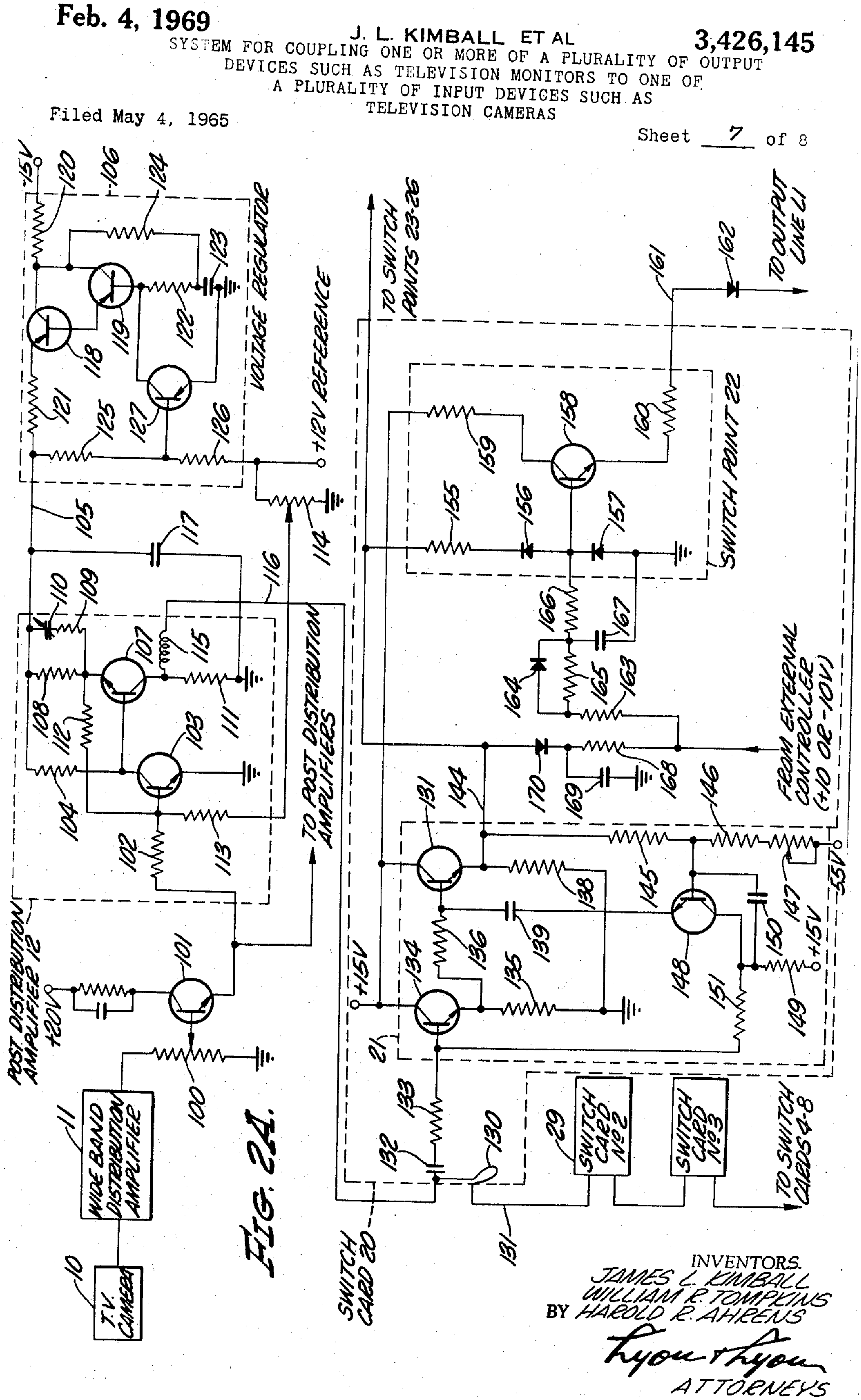
Figure 2B:
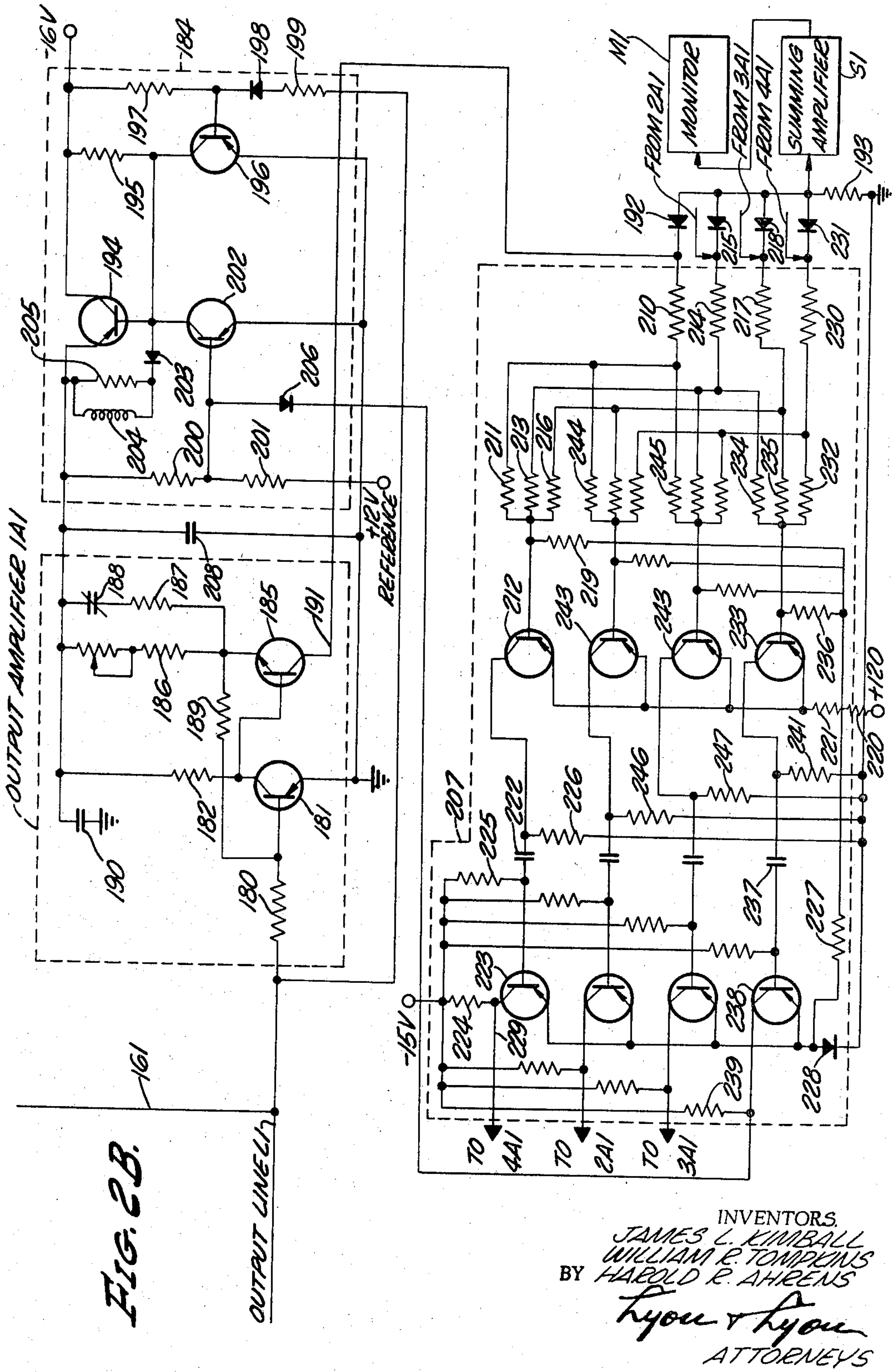

These and other objects and advantages of the present invention will become more apparent upon reference to the accompanying description and drawings in which:

FIGURES 1A, 1B, 1C, 1D, 1E and 1F when taken together show a representative portion of the system of the present invention in block diagram form;

FIGURES 2A and 2B when taken together show the detailed circuitry of a representative signal path in the system of the present invention; and FIGURE 3 illustrates the relationship of FIGURES 1A, 1B, 1C, 1D, 1E and 1F.

Turning now to FIGURE 1, with its component parts laid out as shown in FIGURE 3, a representative portion of the system of the present invention is illustrated. It should be understood that a system according to the present invention could be provided to handle almost any number of television cameras and monitors. Such a system has been constructed to permit the switching of any one of 80 cameras to any one of 160 monitors and the present invention will thus be described with relation to such a representative system. Although the system is described herein as a video switching system, it should be understood that this is for illustrative purposes only and that the system is useful in any environment where switching capacity is useful.

As can be seen in FIGURE 1, a first television camera 10 feeds its output to a distribution amplifier 11. The distribution amplifier 11 has four outputs, each of which feeds one of four post-distribution amplifiers 12, 13, 14 and 15. Each of the post-distribution amplifiers 12, 13, 14 and 15 feeds a video signal to groups 16, 17, 18 and 19 respectively of switch cards, each group containing eight switch cards, the distribution amplifier 11 thus feeding a total of 32 switch cards.

A representative switch card 20 is shown to include an isolation amplifier 21 and five switch points or gating networks 22, 23, 24, 25 and 26, each of which has an input connected to the output of the isolation amplifier 21. The output of each post-distribution amplifier is looped in and out of each of the first seven switch cards in its respective group and terminates in the eighth switch card. Each switch card of a group is provided with an impedance to properly match it to the cable or line impedance and the eighth card is provided with a line terminating impedance having a value equal to the characteristic impedance of the line, so that the cable is in effect an uninterrupted endless transmission line.

The output of each of the switch points is connected to an output line, the switch points of each card coupled to a single camera being connected to a different series of output lines. Thus, switch point 22 is connected to an output line L1, the output of switch point 23 is connected to output line L2, the output of switch point 24 is connected to output line L3, the output of switch point 25 is connected to output line L4, and the output of switch point 26 is connected to output line L5. Each of these output lines is connected to the output of a switch point on twenty different switch cards, each card being connected to a different camera, and thus each assembly of twenty switch cards forms a matrix having twenty inputs and five outputs and provides one hundred switching points.

Each output line is connected to an output amplifier, thus output lines L1, L2, L3, L4 and L5 are connected to output amplifiers 1A1, 1A2, 1A3, 1A4 and 1A5 respectively. Each output amplifier is thus able to be supplied with the outputs of 20 television cameras.

As pointed out above, the output of each post-distribution amplifier is looped into and out of each of the first seven switch cards in its respective group. Each of these switch cards is identical to the first as is the eighth except for the inclusion of a line terminating impedance. Thus, the second switch card 27 is provided with an isolation amplifier 28 and five switch points 29, 30, 31, 32, and 33. The output of these switch points 29 through 33 are connected to output lines L6, L7, L8 and L10 respectively. These output lines are also connected to the switch points of the second switch card fed by each of the cameras in a first group of twenty cameras and are also connected to the inputs of output amplifiers 1A6, 1A7, 1A8, 1A9 and 1A10.

Each of the television cameras feeds a similar distribution system. Thus, television camera 40, the second in the first group of twenty cameras, feeds a distribution amplifier 41 which in turn feeds four post-distribution amplifiers 42, 43, 44 and 45. These post-distribution amplifiers feed groups 46, 47, 48 and 49 of eight switch cards each. The first switch card 50 in the group 46 includes an isolation amplifier 51 and switch points 52, 53, 54, 55 and 56. These switch points are connected to the output lines L1, L2, L3, L4 and L5. The switch points of the second switch card in group 46 are connected to output lines L6 through L10 in the same manner as were the switch points of the switch card 27 of group 16. The switch points of the third switch card in each group is connected to a third series of output lines L11 through L15. This pattern is repeated for each of the other groups of switch cards coupled to each camera.

The distribution system is further illustrated by a third television camera 60 feeding a distribution amplifier 61. The four outputs of the distribution amplifier 61 are fed to the post-distribution amplifiers 62, 63, 64 and 65, each of which feeds a switch card group 66, 67, 68 and 69 respectively. The first card 70 in the group 66 is provided with an isolation amplifier 71 and five switch points 72, 73, 74, 75 and 76. These switch points, like the switch points in the first card of the groups 16 and 46 are connected to output lines L1, L2, L3, L4 and L5 respectively.

Since each group of television cameras includes twenty cameras, four such groups are required to handle the desired total of eighty cameras. Each of these groups is similar to the first group which has been illustrated and described. Thus, television camera 80, which is the first camera of the second group or the twenty-first camera, feeds a distribution amplifier 81 which has four outputs feeding post-distribution amplifiers 82, 83, 84 and 85 respectively. Each of these post-distribution amplifiers feeds a group of eight switch cards, these groups being numbered 86, 87, 88 and 89.

The first switch card 90 in the group 86 is provided with an isolation amplifier 91 and five switch points 92, 93, 94, 95 and 96. These switch points have their output connected to output lines L161, L162, L163, L164 and L165. These output lines are connected to the first switch card fed by each of the cameras in the second group, that is, cameras twenty-one through forty. The second switch card in the first group 86 has its switch points connected to output lines L166 through L170 and the remainder of the system proceeds in the same manner as previously described. The output lines L166–L165 are connected to output amplifiers 2A1, 2A2, 2A3, 2A4 and 2A5 respectively.

The output of the output amplifier 1A1 is fed to one of the inputs of a summing amplifier S1. The output of the summing amplifier S1 is fed to the first television monitor M1. The summing amplifier S1 has three other inputs which are connected to the outputs of the output amplifier in each of the remaining three distribution groups corresponding to output amplifier 1A1 in the first distribution group. Thus, the summing amplifier S1 has inputs connected to output amplifiers 2A1, 3A1 and 4A1. It can thus be seen that the summing amplifier S1 can receive an input signal from each of the cameras in the first group of twenty cameras by means of the output amplifier 1A1, an input signal from each of the cameras in the second group of twenty through output amplifier 2A1, an output from each of the cameras in the third group of twenty through output amplifier 3A1, and an input from each of the cameras in the fourth group of twenty cameras through output amplifier 4A1.

It is therefore possible, by proper energization of a given switch point, to connect any of the eighty cameras to the television monitor M1. Each of the remaining summing amplifiers S2 through S160 are similarly provided with four inputs, each of which is connected to corresponding output amplifiers in each of the four distribution groups. It is therefore possible to connect any selected monitor or group of monitors with any selected television camera of the eighty cameras provided.

Turning now to FIGURES 2A and 2B, the details of a single signal path from one camera to one monitor is shown. The output of the camera 10 is passed through a wideband distribution amplifier 11 and applied across a gain adjusting potentiometer 100. The wiper of the potentiometer 100 is connected to the base of an NPN transistor 101 connected as an emitter follower. The output of the emitter follower transistor 101 is fed to each of the post-distribution amplifiers 12, 13, 14 and 15. The gain of this pre-amplifying arrangement can be adjusted by the potentiometer 100 as required by the level of the input to the amplifier 11.

The post-distribution amplifier 12 receives the output of the transistor 101 through a resistor 102 which is connected to the base of a PNP transistor 103 having its emitter grounded and its collector connected through a resistor 104 to a line 105 which is connected to a voltage regulator 106 which provides the amplifier with a regulated negative potential. The collector of transistor 103 is connected to the base of an NPN transistor 107 which is connected in complementary symmetry with transistor 103. The emitter of transistor 107 is coupled to line 105 through a resistor 108 and through a resistor 109-adjustable capacitor 110 network connected in parallel with the resistor 108. The collector of transistor 107 is connected to ground through a resistor 111. The emitter of transistor 107 is also connected to the base of transistor 103 by a feedback resistor 112. The base of transistor 103 is also connected by a resistor 113 to a potentiometer 114 connected to a +12 volt reference source. The output of the post-distribution amplifier 12 is passed through an inductance 115 and appears on line 116. The capacitor 117 establishes the line 105 as AC ground.

The operation of the post-distribution amplifier 12 is as follows. The transistors 103 and 107 form a high gain complementary symmetry amplifier having a feed-back path through the resistance 112. This circuit is essentially an operational amplifier whose DC voltage output is determined by the values of resistor 113 and feedback resistor 112 and the reference voltage source and thus transistor 107 serves as a constant current source. The output impedance of the collector of transistor 107 is extremely high so that the impedance seen looking back from the line or cable 116 is that of the resistor 111 which is selected to make a good impedance match with the cable. The cable is also matched at the other end by providing a terminating impedance of suitable value on the eighth switch card of the switch card group fed by the amplifier 12. The inductance 115 serves to compensate for the effect of the output capacitance of the collector.

The line or cable 116 has losses at high frequencies and to offset this, the resistor 109 and variable capacitor 110 are inserted in the emitter circuit of the transistor 107. Since the collector current nearly equals the emitter current, this resistance-capacitance network can increase current gain at higher frequencies to compensate for cable losses because its impedance decreases with increasing frequency while the voltage stays constant because the AC voltage is determined by resistors 102 and 112. The values of the resistor 109 and capacitor 110 are chosen to approximate as closely as possible the R.F. losses in the cable.

The use of the post-distribution amplifier just described provides a constant current source that does not load the line or cable 116 and is not responsive to variations within the amplifier. This constitutes a marked improvement over conventional systems in which a potentiometric feedback amplifier is used and connected in series with a resistor and the cable. Good impedance matching with such conventional systems is hard to obtain as it is very difficult to get the required zero output impedance from the feedback amplifier.

The potentiometer 114 provides the amplifier with a variable bias which performs two functions. First, it is used to compensate for changes in DC bias set by the gain potentiometer. Second, it permits bias to be added to limit dissipation in transistor 103 and thereby permits the use of a transistor having wide bandwidth characteristics. Generally, the use of a wide bandwidth transistor means high dissipation which is undesirable.

The voltage regulator 106 includes a PNP transistor 118 connected in series with resistors 120 and 121 between a source of −15 volts and the line 105. A second PNP transistor 119 has its collector connected to the collector of transistor 118 and its emitter connected to the base of transistor 118. The base of the transistor 119 is connected to ground through resistor 122 and capacitor 123. The junction of resistor 122 and capacitor 123 is connected to the collectors of transistors 118 and 119 by resistor 124. The junction of the line 105 and the resistor 121 is connected to the +12 volt reference source by resistors 125 and 126. The junction of these resistors is connected to the base of a PNP transistor 127 whose collector is connected to the base of transistor 119 and whose emitter is grounded.

In operation, if the output voltage appearing at the junction of resistors 121 and 125 varies, the potential at the junction of resistors 125 and 126 also varies, causing a change in the conductivity of transistor 127. This changes the potential at the base of transistor 119 and causes its conductivity to vary, resulting in a variation in the conductivity of the transistor 118 and the consequent return of the potential on line 105 to the proper value. The provision of the voltage regulator further serves to isolate the post-distribution amplifiers so that a number of them may be connected to the same power supply.

As stated previously, the output of the post distribution amplifier appears on line 116. This line is looped into and out of each of the switch cards in group 16. This loop-in and loop-out is preferably accomplished by means of Elko pins and properly matched lengths of exposed wire and cable connections to form line matching T-impedance sections so that the transmission line is effectively extended through the connector of each switch card. Thus, after passing through the loop 130 on the switch card 20, the signal is carried to the switch card 29 by a line 131.

In the switch card 20, the line 116 is coupled by a capacitor 132 to the input of the isolation amplifier 21. The isolation amplifier 21 includes a resistor 133 coupled to the base of an NPN transistor 134 which is connected as an emitter follower, its emitter being tied to ground by a resistor 135 and by a resistor 136 to the base of a second NPN transistor 137 which is also connected as an emitter follower. The emitter of the transistor 137 is connected to ground through a resistor 138 and its base is coupled to ground through a capacitor 139.

The output of the transistor 137 is connected to an output line 144 and is also connected to a −5.5 volt reference source through resistors 145 and 146 and adjustable resistor 147. The junction of resistors 145 and 146 is connected to the base of an NPN transistor 148 whose emitter is grounded and whose collector is connected through a resistor 149 to a +15 volt source. The collector of transistor 148 is also coupled to its base by a capacitor 150 and is further connected to the base of transistor 134 by a resistor 151.

By providing the feedback transistor 148 with a high voltage gain, the DC voltage output of the isolation amplifier 21 can be made dependent only on the values of the resistors 145, 146 and 147 and the negative reference voltage source and thus independent of variations in the amplifier itself. By using the same negative reference source for all of the isolation amplifiers, a slight change in reference voltage will have no overall effect. When the DC output of the transistor 137 varies from the predetermined value of, for example +5.1 volts, the drop across resistors 145, 146 and 147 will vary accordingly. This variation will be amplified by the transistor 148 and will cause the conductivity of the transistor 134, and in turn, of transistor 137 to be varied to bring the potential on the base of transistor 148 back to the value determined by the reference voltage source and the adjustment of resistor 147. However, it is desirable that the feedback amplifier 148 have high gain only for DC and therefore the capacitor 150 is provided to make the feedback circuit an integrator so that the voltage gain is inversely proportional to frequency. As a consequence, the isolation amplifier offers a high input impedance for video signals but permits the DC bias level on the line 144 to set by the external reference voltage. This is important as different temperature conditions at different isolation amplifiers would otherwise cause a change of DC level on the output lines (e.g., L1–L5) when one is switched off and another switched on.

The line 144 is connected to each of the switch points 22 through 26. Each of these switch points is identical and only switch point 22 is illustrated. As shown, the switch point 22 includes a resistor 155 having one end connected to the line 144 and the other end connected to the cathode of a diode 156, and a diode 157 having its cathode connected to the anode of the diode 156 and its anode connected to ground. The junction of the diodes 156 and 157 is connected to the base of an NPN transistor 158 whose collector is connected to a source of positive potential by a resistor 159 and whose emitter is connected through a resistor 160 to a line 161 which is in turn connected to the output line L1 through a diode 162.

The junction of the diodes 156 and 157 is further connected to a source of external control signals, which in the system constructed took the form of DC voltage levels of either +10 volts or −10 volts, through a resistor 163, the parallel combination of a diode 164 and a resistor 165, and a resistor 166. The junction of the parallel combination and the resistor 166 is connected to ground through a capacitor 167.

For reasons to be explained hereinafter, the external control signal is connected through a resistor 168 and a capacitor 169 to ground. The junction of the resistor 168 and capacitor 169 is connected to the cathode of a diode 170, the anode of which is connected to the line 144.

The operation of the switch point is as follows. Assuming that the output of the isolation amplifier has a DC output voltage level of +5.1 volts with a 1 volt peak to peak video signal superimposed thereon and that the switch point 22 is on and is to be switched off, a control signal of −10 volts is generated in place of a +10 volt signal and reverse biases diode 156 blocking the video signal and forward biases diode 157, shunting the base of transistor 158 to ground. This causes the transistor 158 to be rendered non-conducting. Thus, the video signal from the camera 10 is prevented from reaching the output line L1 in four different manners: the diode 156 blocks the signal, any signal that does pass diode 156 is shunted to ground, the transistor 158 is not conducting and thus does not pass or amplify any video signal that may happen to be applied to its base and the diode 162 is back biased. The diode 162 is also provided in the line 161 to block the positive DC voltage which could otherwise be applied to the emitter of transistor 158 by the similar circuits on another switch card connected to the output line L1 and to minimize the capacitive loading on this line. A control signal of +10 volts reverse biases diode 157 and forward biases diode 156. The resulting positive voltage at the base of transistor 158 turns it on and the video signals are passed through it to the line 161.

The characteristics of the transistor 158 and the input impedance to its base produce an inductive output reactance. Since output line L1 is an unterminated short transmission line, its principal impedance component is capacitive reactance. Proper selection of the resistor 160 connecting the emitter follower 158 to output line L1 permits control of the frequency response characteristics of the resultant complex pole pair. The resistance of this resistor must take into account the emitter resistance of transistor 158 and the dynamic resistance of the diode 162.

The network 168, 169 and 170 is provided to assure that a constant load is presented to the isolation amplifier 21 whether or not the switch point is actuated. When the control signal is positive, the diode 170 is back biased and this compensating network is effectively disconnected from the line 144. When the control signal is negative, however, the diode 170 is forward biased and the compensating network loads the isolation amplifier 21 to the same degree that the switch point 22 would if it were switched on.

At the output of any given switch point, DC level changes accompany the video switching. Further, the command which turns off a given switch point generally must occur before the command which turns on another switch point associated with the same switching matrix. Uncancelled "DC transients" lead to undesirable disturbances at the monitor. For these reasons, it is required that the effect of a +10 volt or "on" control signal be much more rapid than the effect of a −10 volt or "off" control signal. This is accomplished by the network 163, 164, 165, 166 and 167.

As can be seen, the diode 164 shunts the resistor 165 when a positive control signal appears, and thus the network has a relatively fast rise time as the time constant of the network is determined only by resistor 163 and capacitor 167. On the other hand, if a negative control signal appears, the diode 164 is out of the circuit so that the time constant of the network depends on the values of both resistors 163 and 165 and the capacitor 167. By providing the resistor 165 with a substantially greater value than the resistor 163, for example, four times greater, the effect of the negative control signal can be made much slower than that of the positive control signal.

The output line L1 is fed to the input of output amplifier 1A1 where it is coupled by resistor 180 to the base of the PNP transistor 181, the collector of which is connected by a resistor 182 to a negative voltage line 183 leading to voltage regulator 184. The collector of transistor 181 is also connected to the base of NPN transistor 185 whose emitter is connected to negative voltage line 183 by a resistor 186 and by a series network of resistor 187 and variable operational in nature by providing transistor 181 with high gain so that the output is dependent only on the values of the resistors 180 and 189. Consequently, the transistor 185 functions as a constant current generator with additional current at high frequencies being supplied as a result of the characteristics of resistor-capacitor network 187–188 in the same manner as in post-distribution amplifier 12. The output of the amplifier 1A1 is fed by a line 191 to the summing amplifier S1 through a diode 192. A line terminating resistor 193 is connected between diode 192 and the input of the summing amplifier.

The voltage regulator 184 is basically similar to the voltage regulator 106 and includes a PNP transistor 194 connected in series with the line 183 and a −16 volt source. The collector of transistor 194 is coupled by a resistor 195 to the collector of a PNP transistor 196 whose emitter is grounded. The base of transistor 196 is coupled to the −16 volt source by a resistor 197 and is coupled to the output line L1 by a diode 198 and resistor 199.

The emitter of transistor 194 is coupled to a +12 volt reference source by resistors 200 and 201. The junction of these resistors is connected to the base of a PNP transistor 202 whose collector is connected to the base of transistor 194 and whose emitter is grounded. The collector of transistor 196 is also connected to the base of transistor 194 as is the anode of a diode 203. The cathode of diode 203 is connected to the emitter of transistor 194 by the parallel combination of inductor 204 and resistor 205. The base of transistor 202 is connected by a diode 206 to one output of regulator control logic 207. A capacitor 208 is connected between line 183 and ground.

In operation, if the transistor 196 is not conducting and the transistor 202 has a high gain, any variation in emitter voltage of transistor 194 will be reflected at the base of transistor 202 causing the conductivity of this transmitter to change. This varies the potential at the base of transistor 194 and causes the predetermined output voltage to be re-established. Thus, if transistor 196 does not conduct, the potential supplied along line 183 to the output amplifier 1A1 will remain constant. The transistor 196 will not conduct so long as one of the switch points 22 through 26 feeding the output amplifier 1A1 is energized because the base of transistor 196 is connected to output line L1 by diode 198 and resistor 199 and the DC level on the line will keep its base positive. The voltage regulator 184 will thus supply voltage to the output amplifier 1A1 when any switch point connected to output line L1 is energized.

When all of the switch points are turned off, the voltage supplied to the input of output amplifier 1A1 along output line L1 drops to zero and the base of transistor 196 goes sufficiently negative to cause this transistor to saturate. When transistor 196 is turned on in this manner, the collector of transistor 196 goes to ground as does the base of transistor 194. Transistor 194 then ceases to conduct and the voltage supplied to the output amplifier 1A1 goes to near zero, with the result that this amplifier is turned off. This results in a significant reduction in the energy consumed by the system. In a manner to be explained hereinafter, the turning off of the output amplifier 1A1 causes the diode 192 to be back biased by a source of +20 volts and thereby prevents leakage video signals from reaching the summing amplifier S1 and monitor M1. This greatly attenuates any leakage and eliminates cross-talk. The rate and shape of decrease of the DC output of transistor 185, applied by the de-energizing output amplifier 1A1 to the summing amplifier S1 is controlled by capacitor 208 discharging through inductor 204 and resistor 205, diode 203 and transistor 202, after the regulator is switched off by the pulse to the base of transistor 196. The rate of increase of the DC output of the energizing output amplifier 1A1 when a signal appears at its input is controlled by capacitor 208 charging when the regulator is switched on. The inductance-resistance network 204–205 is designed to equalize the charge and discharge rates of capacitor 208.

In the event that one of the other output amplifiers coupled to the summing amplifier S1 is being turned on at the same time that output amplifier 1A1 is being turned off, it is desirable that the amplifier 1A1 be turned off more rapidly than is done by the just described procedure so that there will be no flashing in the monitor. Regulator control logic 207 is therefore provided to perform this function. This regulator control logic 207 operates to supply a negative voltage to the cathode of diode 206 causing it to conduct and the transistor 202 to saturate. Saturation of transistor 202 causes it to cease working as a DC amplifier and its collector goes to ground. The base of transistor 194 likewise goes to ground and since it is connected as an emitter follower, its output follows its base and also goes to ground, turning off the output amplifier 1A1.

Regulator control logic 207 includes a resistor 210 having one end connected to the junction of line 191 and diode 192 and the other end connected through a resistor 211 to the base of a PNP transistor 212. The base of transistor 212 is also connected through resistor 213 and resistor 214 to the junction of the output from output amplifier 2A1 and diode 215 and through resistor 216 and 217 to the junction of the output of output amplifier 3A1 and diode 218. The base of transistor 212 is also connected through resistors 219 and 220 to a source of +20 volts. The emitter of the transistor 212 is also connected to the source of +20 volts through a resistor 221 and the resistor 220.

The collector of transistor 212 is coupled through a capacitor 222 to the base of a PNP transistor 223 whose collector is connected to a −15 volt source through a resistor 224 and whose emitter is connected to the +20 volt source through resistor 227 and resistor 220 and also connected to the anode of a diode 228 whose cathode is connected to ground. The collector of transistor 223 is also connected through line 229 to the diode in output amplifier 4A1 corresponding to diode 206 in amplifier 1A1. The base of transistor 223 is connected by a resistor 225 to the source of −15 volts and the collector of transistor 212 is connected to ground through resistor 226.

The regulator control logic 207 has four current paths, each of them similar to the one just described. For example, a resistor 230 connected to the junction of the output of output amplifier 4A1 and the diode 231 is connected to one end of a resistor 232 the other end of which is connected to the PNP transistor 233. The base of transistor 233 is also connected through resistor 234 and resistor 214 to the output of output amplifier 2A1 and through resistor 235 and 217 to the output of output amplifier 3A1. The transistor 233 is thus responsive to the outputs of amplifiers 2A1, 3A1 and 4A1 while the transistor 212 is responsive to the outputs of amplifiers 1A1, 2A1 and 3A1.

The base of transistor 233 is connected to the +20 volt source through resistor 236 and resistor 220, and its emitter is also connected to this source through resistors 221 and 220. The collector of transistor 233 is coupled through a capacitor 237 to the base of a PNP transistor 238 which has its collector connected through resistor 239 to the source of −15 volts and its emitter connected through resistors 227 and 220 to the source of +20 volts. As was the case with transistor 223, the emitter of transistor 238 is also coupled through diode 228 to ground. The base of transistor 238 is connected to the source of −15 volts by resistor 240 and the collector of transistor 233 is connected to ground through resistor 241.

The regulator control logic 207 operates in the following manner. Let it be assumed that the output amplifier 1A1 is turned on when one of the other amplifiers 2A1, 3A1 or 4A1 also associated with summing amplifier S1 is turned on. Prior to the turning on of this latter amplifier, the cathodes of diodes 215, 218 and 231 will be pulled positive to approximately +20 volts by the source of +20 volts and the various resistance networks, such as the network 220, 236, 234, and 214; the network 220, 236, 235 and 217; and the network 220, 236, 232 and 230. The cathode of the diode 192, associated with the active amplifier 1A1, will be at a negative voltage. This negative voltage will keep transistors 212, 242 and 243 saturated on through resistors 211, 244 and 245. The collectors of these transistors are thus at near zero volts and the voltage across the load resistors 226, 246 and 247 is zero. Each of these load resistors is AC coupled to its respective output transistor, e.g., transistor 223, which is biased into saturation so that its collector is at its emitter voltage which is slightly positive because of the voltage drop across diode 228. The transistor 233, unlike transistors 212, 242 and 243, is not conducting as its base is held at approximately +20 volts.

Assume now that output amplifier 2A1 is energized. The voltage at the cathode of diode 215 drops suddenly to a slightly negative value with the result that a large voltage drop occurs across resistors 220, 236, 234 and 214 with a consequent drop in the voltage at the base of transistor 233. This negative pulse at the base of transistor 233 causes this previously non-conducting transistor to conduct. The resulting positive excursion of the collector of the transistor 233 is coupled to the base of transistor 238 by the capacitor 237, momentarily turning off the normally saturated transistor 238 and producing a negative pulse at its collector until the capacitor 237 is charged. The negative-going pulse appearing at the collector of transistor 233 causes the diode 206 to conduct with the result that the transistor 202 is caused to saturate, the voltage regulator 184 is turned off and the output amplifier 1A1 is also turned off. The voltage at the cathode of diode 192 will now be pulled positive to about +20 volts by the source of +20 volts and the various resistance networks. This is the +20 volts previously referred to as back biasing the diode 192 and eliminating cross-talk.

As can be seen from a review of the above discussion, each signal path from a camera to a monitor includes a number of switching stages which must be "closed" if the output of the camera is to appear at the input of the monitor. First, the switch point, e.g. 22, which chooses the unique signal path desired must be energized. Then, the back bias on the diode 162 must be removed. The output amplifier 1A1 must be energized, which requires that its associated voltage regulator 184 must first be energized. Finally, the back bias on the diode 192 must be removed which necessitates the proper action of regulator control logic 207. When a different signal path is chosen, each of these switching stages must be "opened." As explained in the preceding discussion, each of these switching stages, save the switch point 22, is controlled by the DC level which is imparted internally to the video signal at the isolation amplifier 21. This DC level is thus in effect an internally generated logic signal which assures the proper sequential operation of the various switching stages in the signal path and eliminates the need for separate external control logic for each of them.

From the foregoing description it can be seen that a system has been provided that is capable of switching the output of any of a plurality of signal generating means such as television cameras to the input of one or more selected signal utilizing means such as television monitors. Different cameras may be sequentially connected to the same monitor without causing flashing or fade-out in the monitor. The various signal paths within the system introduce minimum distortion into the translated signals and the paths are electrically isolated from each other so that cross-talk and other interference is essentially eliminated. The system is provided with safeguards that assure that only one signal can be applied to a monitor at any one time and is also arranged so that power consuming devices such as amplifiers are deenergized when not in use. As illustrated, the energization of only one switch point is all that is required to close a signal path. As will be obvious to one skilled in the art, the system, if desired, could be modified to require that a given combination of switch points would have to be energized to close a signal path. In this respect, the system would operate to the same effect as a conventional switching matrix.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A switching system for completing selected ones of a plurality of signal paths between the outputs of a plurality of signal generating means and the inputs of a plurality of signal utilizing means, comprising:

means coupled to each of said signal generating means for adding a DC logic signal to the signals generated thereby;

first switch means in each signal path which close in response to an external control signal;

means for applying an external control signal to selected ones of said first switch means;

a plurality of additional switch means in each of said signal paths serially coupled with said first switch means; and means responsive to said DC logic signal to close each of the additional switch means in a signal path when the first switch means therein is closed whereby said selected signal paths are completed.

2. The system of claim 1 wherein means are provided for preventing concurrent completion of more than one signal path to a single signal utilizing means.

3. A switching system having a plurality of inputs and a plurality of outputs, comprising:

means for applying an individual information signal to each of said inputs;

means coupled to each of said inputs for adding a logic signal to the information signal applied thereto;

a plurality of first switch means, each of said first switch means coupling a single input to a single output;

a plurality of additional switch means, each of said additional switch means being coupled to a plurality of said first switch means and a single output, whereby each of said first switch means and at least one of said additional switch means are serially coupled to form a unique signal path between a single input and a single output;

means for selectively applying an external control signal to an individual one of said first switch means, said individual first switch means being operable to close in response to said control signal to pass said information and logic signal; and means responsive to said logic signal to close each additional switch means serially coupled in a signal path with said closed first switch means whereby said information signal is passed to the output associated with said first switch means.

4. The system of claim 3 wherein means are provided for preventing concurrent completion of more than one signal path to a single output.

5. A system for switching the output of a selected one of a plurality of signal generating means to the input of one or more of a plurality of signal utilizing means, comprising:

a plurality of amplifying means, each of said amplifying means being coupled to the output of one of said signal generating means;

a plurality of series of switching assembly means, each of said series being coupled to the output of one of said amplifying means, each of said switching assembly means including a plurality of switch means, the output of each of said amplifying means being fed to one side of each of said switch means associated therewith;

a plurality of sets of output lines, each set having at least as many lines as the number of switch means in each switching assembly means;

means coupling each set of output lines to one plurality of switch means associated with each signal generating means whereby each plurality of switch means associated with a single signal generating means is coupled to a different set of output lines, each switch means in each plurality thereof having its other side coupled to a different line of its respective set of output lines;

means coupled to each of said switch means for individually opening and closing said switch means;

output amplifying means coupled to each of said output lines; and means coupling each of said output amplifying means to the input of a different one of said signal utilizing means.

6. A system for switching the output of a selected one of a plurality of signal generating means to the input of one or more of a plurality of signal utilizing means, comprising:

a plurality of series of amplifying means, each of said series being coupled to the output of one of said signal generating means;

a plurality of series of switching assembly means, each of said series being coupled to the output of one of said amplifying means, each of said switching assembly means including a plurality of switch means, the output of each of said amplifying means being fed to one side of each of said switch means associated therewith;

a plurality of sets of output lines, each set having at least as many lines as the number of switch means in each switching assembly means;

means coupling each of sets of output lines to one plurality of switch means associated with each signal generating means whereby each plurality of switch means associated with a single signal generating means is coupled to a different set of output lines, each switch means in each plurality thereof having its other side coupled to a different line of its respective set of output lines;

means coupled to each of said switch means for individually closing or opening said switch means whereby the output of the signal generating means coupled to said one side of said switch means is either coupled to or blocked from the output line coupled to the other side of said switch means;

output amplifying means coupled to each of said output lines; and means coupling each of said output amplifying means to the input of a different one of said signal utilizing means.

7. A system for switching the output of a signal generating means selected from a plurality of groups of signal generating means to the input of one or more of a plurality of signal utilizing means, comprising:

a plurality of series of amplifying means, each of said series being coupled to the output of one of said signal generating means;

a plurality of series of switching assembly means, each of said series being coupled to the output of one of said amplifying means. each of said switching assembly means including a plurality of switch means, the output of each of said amplifying means being fed to one side of each of said switch means associated therewith;

a plurality of sets of output lines, each set having at least as many lines ah the number of switch means in each switching assembly means;

means coupling each set of output lines to one plurality of switch means associated with each signal generating means in a group of signal generating means whereby each plurality of switch means associated with a single signal generating means is coupled to a different set of output lines, each switch means in each plurality thereof having its other side coupled to a different line of its respective set of output lines;

means coupled to each of said switch means for individually opening or closing said switch means;

output amplifying means coupled to each of said output lines;

a plurality of summing amplifier means having a plurality of inputs and an output;

means coupling the output of each of said summing amplifier means to the input of a different signal utilizing means; and means coupling each input of each of said summing amplifier means to a different output amplifying means, each summing amplifier means having at least one input coupled to an output amplifying means associated with each group of signal generating means.

8. The system of claim 7 wherein means are provided for preventing more than one output amplifying means coupled to a single summing amplifier means from being operative at the same time.

9. A system for switching the output of a television camera selected from a plurality of groups of television cameras to the input of one or more of a plurality of television monitors, comprising:

a plurality of series of amplifying means, each of said series being coupled to the output of one of said television cameras;

a plurality of series of switching assembly means, each of said series being coupled to the output of one of said amplifying means, each of said switching assembly means including a plurality of switch means, the output of each of said amplifying means being fed to one side of each of said switch means associated therewith;

a plurality of sets of output lines, each set having at least as many lines as the number of switch means in each switching assembly means;

means coupling each set of output lines to one plurality of switch means associated with each television camera in a group of cameras whereby each plurality of switch means associated with a single camera is coupled to a different set of output lines, each switch means in each plurality thereof having its other side coupled to a different line of its respective set of output lines;

means coupled to each of said switch means for individually opening or closing said switch means;

output amplifying means coupled to each of said output lines;

a plurality of summing amplifier means having a plurality of inputs and an output;

means coupling the output of each of said summing amplifier means to the input of a different television monitor;

means coupling each input of each of said summing amplifier means to a different output amplifying means, each summing amplifier means having at least one input coupled to an output amplifying means associated with each group of cameras;

means coupled to each of said output amplifier means and operative to supply electrical energy thereto; and means rendering each of said energy supplying means operative only when one of the switch means coupled to its respective output amplifying means is closed.

10. A system for switching the output of a television camera selected from a plurality of groups of television cameras to the input of one or more of a plurality of television monitors, comprising:

a plurality of series of amplifying means, each of said series being coupled to the output of one of said television cameras;

a plurality of series of switching assembly means, each of said series being coupled to the output of one of said amplifying means, each of said switching assembly means including a plurality of switch means, the output of each of said amplifying means being fed to one side of each of said switch means associated therewith;

a plurality of sets of output lines, each set having at least as many lines as the number of switch means in each switching assembly means;

means coupling each set of output lines to one plurality of switch means associated with each television camera in a group of cameras whereby each plurality of switch means associated with a single camera is coupled to a different set of output lines, each switch means in each plurality thereof having its other side coupled to a different line of its respective set of output lines;

means coupled to each of said switch means for individually opening or closing said switch means;

output amplifying means coupled to each of said output lines;

a plurality of summing amplifier means having a plurality of inputs and an output;

means coupling the output of each of said summing amplifier means to the input of a different television monitor;

means coupling each input of each of said summing amplifier means to a different output amplifying means, each summing amplifier means having at least one input coupled to an output amplifying means associated with each group of cameras;

means coupled to each of said output amplifier means and operative to supply electrical energy thereto;

means rendering each of said energy supplying means operative only when one of the switch means coupled to its respective output amplifying means is closed;

a plurality of logic circuit means, each of said means having a plurality of inputs and a plurality of outputs;

means coupling the inputs of each said logic circuit means to the inputs of a different one of said summing amplifier means; and means coupling the outputs of each logic circuit means with the energy supplying means coupled to the output amplifying means coupled to its respective summing amplifier means, said logic circuit means acting to render inoperative all but one of said voltage regulator means.

11. The system of claim 10 wherein each of said logic circuit means comprises a plurality of individual circuits, each of said circuits having inputs coupled to all but one of said summing amplifier means inputs and an output coupled to the energy supplying means coupled to the output amplifying means coupled to the remaining summing amplifier means input.

12. In a system for switching the output of a selected one of a plurality of signal generating means to the input of one or more of a plurality of signal utilizing means, comprising:

a plurality of series of amplifying means, each of said series being coupled to the output of one of said signal generating means;

a plurality of series of switching assembly means, each of said series being coupled to the output of one of said amplifying means, each of said switching assembly means including a plurality of switch means, the output of each of said amplifying means being fed to one side of each of said switch means associated therewith;

a plurality of sets of output lines, each set having at least as many lines as the number of switch means in each switching assembly means;

means coupling each set of output lines to one plurality of switch means associated with each signal generating means whereby each plurality of switch means associated with a single signal generating means is coupled to a different set of output lines, each switch means in each plurality thereof having its other side coupled to a different line of its respective set of output lines;

means coupled to each of said switch means for individually closing or opening said switch means whereby the output of the signal generating means coupled to said one side of said switch means is either coupled to or blocked from the output line coupled to the other side of said switch means;

output amplifying means coupled to each of said output lines;

means coupling each of said output amplifying means to the input of a different one of said signal utilizing means;

means coupled to each of said output amplifier means and operative to supply electrical energy thereto; and means coupling each energy supplying means to the output line coupled to its respective output amplifying means for rendering said energy supplying means operative only when one of the switch means coupled to said output line is closed.

13. In a system for switching the output of a selected one of a plurality of signal generating means to the input of one or more of a plurality of signal utilizing means, comprising:

a plurality of series of amplifying means, each of said series being coupled to the output of one of said signal generating means;

a plurality of series of switching assembly means, each of said series being coupled to the output of one of said amplifying means, each of said switching assembly means including an isolation amplifier having an input coupled to the output of said amplifying means and an output, and a plurality of switches coupled to said output of said isolation amplifier, the output of each of said amplifying means being fed to one side of each of the switches associated therewith;

means coupled to each of said switches for individually opening or closing them;

a plurality of compensating circuits coupled to the output of each of said isolation amplifiers, each of said circuits being associated with one of said switches and being operable to load the output of said isolation amplifier to the same degree as its respective switch does when closed, each of said circuits being coupled to said means for opening and closing said switches and being operated thereby whenever its respective switch is opened;

a plurality of sets of output lines, each set having at least as many lines as the number of switches in each switching assembly means;

means coupling each set of output lines to one plurality of switches associated with each signal generating means whereby each plurality of switches associated with a single signal generating means is coupled to a different set of output lines, each switch in each plurality thereof having its other side coupled to a different line of its respective set of output lines;

output amplifying means coupled to each of said output lines; and means coupling each of said output amplifying means to the input of a different one of said signal utilizing means.

14. In a system for switching the output of a selected one of a plurality of signal generating means to the input of one or more of a plurality of signal utilizing means, comprising:

a plurality of series of amplifying means, each of said series being coupled to the output of one of said signal generating means;

a plurality of series of switching assembly means, each of said series being coupled to the output of one of said amplifying means, each of said switching assembly means including a plurality of gating networks, the output of each of said amplifying means being fed to the input of each of said gating networks associated therewith, each of those gating networks being responsive to a gating pulse of a first polarity to pass signals applied to its input and responsive to a blocking pulse of a second polarity to block signals applied to its input;

a plurality of sets of output lines, each set having at least as many lines as the number of gating networks in each switching assembly means;

means coupling each set of output lines to one plurality of gating networks associated with each signal generating means whereby each plurality of gating networks associated with a single signal generating means is coupled to a different set of output lines, each gating network in each plurality thereof having its output coupled to a different line of its respective set of output lines;

means coupled to each of said gating networks for supplying a gating or a blocking pulse thereto;

output amplifying means coupled to each of said output lines; and means coupling each of said output amplifying means to the input of a different one of said signal utilizing means.

15. The system of claim 14 wherein means are provided in said pulse supplying means for delaying pulses of one of said polarities.

16. In a system for switching the output of a selected one of a plurality of signal generating means to the input of one or more of a plurality of signal utilizing means, comprising:

a plurality of series of amplifying means, each of said series being coupled to the output of one of said signal generating means;

a plurality of series of switching assembly means, each of said series being coupled to the output of one of said amplifying means, each of said switching assembly means including an isolation amplifier having an input coupled to the output of said amplifying means and an output, and a plurality of gating networks coupled to said output of said isolation amplifier, the output of each of said amplifying means being fed to the input of each of said gating networks associated therewith, each of said gating networks being responsive to a gating pulse of a first polarity to pass signals applied to its input and responsive to a blocking pulse of a second polarity to block signals applied to its input;

a plurality of compensating circuits coupled to the output of each of said isolation amplifiers, each of said circuits being associated with one of said gating networks and being operable upon receipt of a pulse of said second polarity to load the output of said isolation amplifier to the same degree its respective gating network does when said gating network is in the signal passing state;

a plurality of sets of output lines, each set having at least as many lines as the number of gating networks in each switching assembly means;

means coupling each set of output lines to one plurality of gating networks associated with each signal generating means whereby each plurality of gating networks associated with a single signal generating means is coupled to a different set of output lines, each gating network in each plurality thereof having its output coupled to a different line of its respective set of output lines;

means coupled to each of said gating networks and its associated compensating circuit for supplying a gating or a blocking pulse thereto;

output amplifying means coupled to each of said output lines; and means coupling each of said output amplifying means to the input of a different one of said signal utilizing means.

17. The system of claim 16 further including means coupled to each of said output amplifier means and operative to supply electrical energy thereto and means coupling each energy supplying means to the output line coupled to its respective output amplifying means for rendering said energy supplying means operative only when one of the gating networks coupled to said output line is in the signal passing state.

18. The system of claim 16 wherein means are provided in said pulse supplying means for delaying pulses of one of said polarities.

19. A system for switching the output of a television camera selected from a plurality of groups of television cameras to the input of one or more of a plurality of television monitors, comprising:

a plurality of series of amplifying means, each of said series being coupled to the output of one of said television cameras;

a plurality of series of switching assembly means, each of said series being coupled to the output of one of said amplifying means, each of said switching assembly means including an isolation amplifier having an input coupled to the output of said amplifying means and an output, and a plurality of gating networks coupled to said output of said isolation amplifier, the output of each of said amplifying means being fed to the input of each of said gating networks associated therewith, each of said gating networks being responsive to a gating pulse of a first polarity to pass signals applied to its input and response to a blocking pulse of a second polarity to block signals applied to its input;

a plurality of compensating circuits coupled to the output of each of said isolation amplifiers, each of said circuits being associated with one of said gating networks and being operable upon receipt of a pulse of said second polarity to load the output of said isolation amplifier to the same degree its respective gating network does when said gating network is in the signal passing state;

a plurality of sets of output lines, each set having at least as many lines as the number of gating networks in each switching assembly means;

means coupling each set of output lines to one plurality of gating networks associated with each television camera in a group of cameras whereby each plurality of gating networks associated with a single camera is coupled to a different set of output lines, each gating network in each plurality thereof having its output coupled to a different line of its respective set of output lines;

means coupled to each of said gating networks and its associated compensating circuit for supplying a gating or a blocking pulse thereto;

output amplifying means coupled to each of said output lines;

a plurality of summing amplifier means having a plurality of inputs and an output;

means coupling the output of each of said summing amplifier means to the input of a different television monitor;

means coupling each input of each of said summing amplifier means to a different output amplifying means, each summing amplifier means having at least one input coupled to an output amplifying means, each summing amplifier means having at least one input coupled to an output amplifying means associated with each group of cameras;

means coupled to each of said output amplifier means and operative to supply electrical energy thereto;

means coupling each energy supplying means to the output line coupled to its respective output amplifying means for rendering said energy supplying means operative only when one of the gating networks coupled to said output line is in the signal passing state;

a plurality of logic circuit means, each of said means having a plurality of inputs and a plurality of outputs;

means coupling the inputs of each said logic circuit means to the inputs of a different one of said summing amplifier means; and means coupling the outputs of each logic circuit means with the energy supplying means coupled to the output amplifying means coupled to its respective summing amplifier means, said logic circuit means acting to render inoperative all but one of said voltage regulator means.

20. The system of claim 19 wherein each of said logic circuit means comprises a plurality of individual circuits, each of said circuits having inputs coupled to all but one of said summing amplifier means inputs and an output coupled to the energy supplying means coupled to the output amplifying means coupled to the remaining summing amplifier means input.

21. The system of claim 19 wherein means are provided in said pulse supplying means for delaying pulses of one of said polarities.

22. A switching system for connecting the input of one of a plurality of signal utilizing means to the output of one of a plurality of signal generating means generating a signal comprising: means for adding a logic signal to said generated signal;

a plurality of switch means serially coupling said input with said output and said logic signal adding means, each of said switch means being normally open to prevent passage of said generated signal and said logic signal;

means for closing a first of said serially coupled switch means in response to an external control signal to permit passage of said generated signal and said logic signal; and means responsive to said logic signal to close each of said other serial switch means whereby said generated signal is passed to said signal utilizing means.

23. A switching system for completing a selected one of a plurality of signal paths between one of a plurality of signal utilizing means and one of a plurality of signal generating means generating a signal, comprising:

means for adding a DC logic signal to the signal generated by said signal generating means;

a plurality of switch means serially coupled in said selected signal path, each of said switch means being normally open to prevent passage of said generated signal and said logic signal;

means for applying an external control signal to the first of said switch means, said first switch means being operable to close in response to said external control signal whereby said generated signal and said DC logic signal are passed through said first switch means; and means responsive to said DC logic signal to close each of said other serially coupled switch means whereby said selected signal path is completed and said generated signal is passed to said signal utilizing means.

References Cited

UNITED STATES PATENTS

| | | | |
|---|---|---|---|
| 2,189,287 | 2/1940 | Hershey | 250—20 |
| 3,046,331 | 7/1962 | Gebel | 178—6.8 |

ROBERT L. GRIFFIN, *Primary Examiner.*

R. K. ECKERT, JR., *Assistant Examiner.*

U.S. Cl. X.R.

178—6